C. D. JAUER.
GRUBBING PLOW.
APPLICATION FILED FEB. 11, 1909.
953,909.
Patented Apr. 5, 1910.
2 SHEETS—SHEET 2.
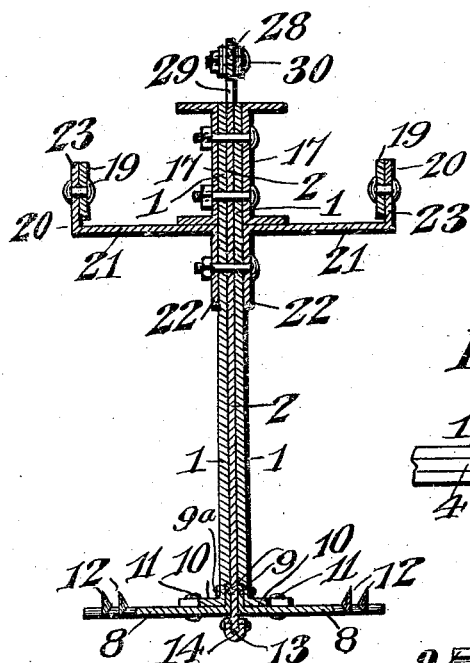
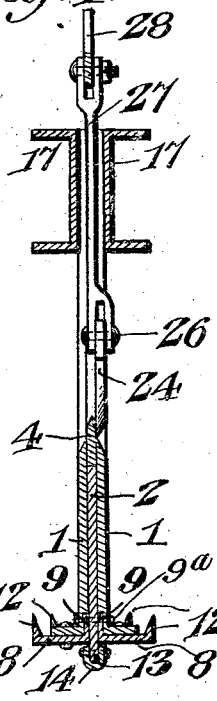
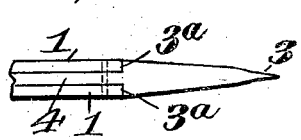
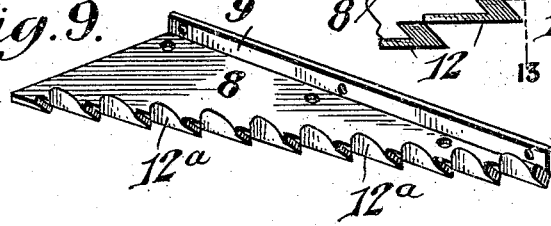
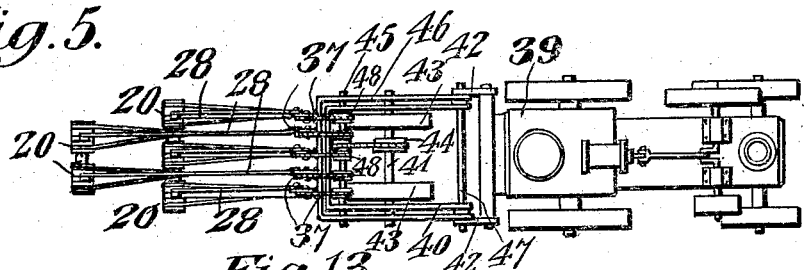
C. D. Jauer, Inventor

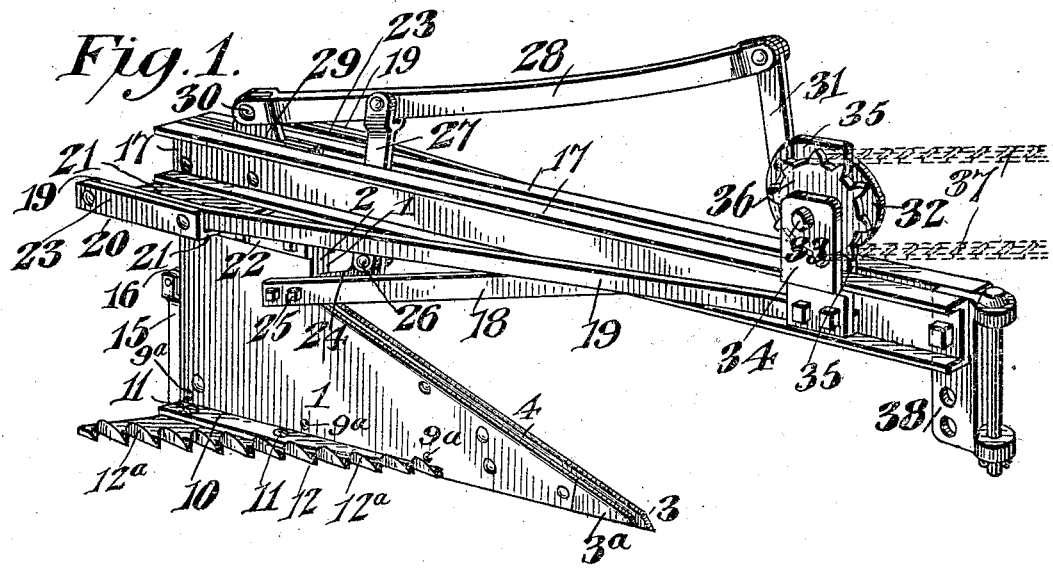

UNITED STATES PATENT OFFICE.

CHRISTMAN D. JAUER, OF KARNES CITY, TEXAS.

GRUBBING-PLOW.

953,909.  Specification of Letters Patent.  Patented Apr. 5, 1910.

Application filed February 11, 1909. Serial No. 477,266.

*To all whom it may concern:*

Be it known that I, CHRISTMAN D. JAUER, a citizen of the United States, residing at Karnes City, in the county of Karnes and State of Texas, have invented a new and useful Grubbing-Plow, of which the following is a specification.

The invention relates to a grubbing plow.

The object of the present invention is to provide a simple, efficient and comparatively inexpensive grubbing plow, designed for preparing land for cultivation after the land has been cleared of timber, and adapted to operate effectively in sections of country where there is considerable underbrush, and capable of splitting and tearing the stumps to pieces and of severing the underbrush at the throat of the plow to prevent the latter from becoming clogged.

Another object of the invention is to provide a grubbing plow of this character, designed to be operated in a gang in connection with a traction engine, and capable of following the same in a straight line without liability of slipping sidewise around and thereby passing a stump.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a grubbing plow, constructed in accordance with this invention. Fig. 2 is a longitudinal sectional view of the same. Fig. 3 is a transverse sectional view on the line 3—3 of Fig. 2. Fig. 4 is a similar view on the line 4—4 of Fig. 2. Fig. 5 is a plan view of a traction engine and a gang of grubbing plows, illustrating the arrangement of the latter. Fig. 6 is a detail perspective view of the vertical blade and plow points. Fig. 7 is a similar view of one of the side plates of the plow. Fig. 8 is a similar view of the intermediate spacing plate. Fig. 9 is a perspective view of one of the plowshares. Fig. 10 is a detail view of the plow point. Fig. 11 is a reverse plan view, showing a portion of the plowshares and illustrating the arrangement of the opposite teeth. Fig. 12 is a plan view of a portion of one of the plowshares. Fig. 13 is a sectional view on the line 13—13 of Fig. 12.

Like numerals of reference designate corresponding parts in all the figures of the drawings.

1—1 designate vertically disposed forwardly tapered side plates, constructed of steel and spaced apart by an intermediate plate 2, also tapered forwardly and preferably constructed of the same material as the side plates, and spacing the latter for the reception of a plow point 3 and a vertical cutting blade 4, formed integral with the plow point and secured between the side plates by suitable fastening devices. In practice, the plow point and the blade will be removable to enable them to be readily detached for sharpening. The plow point is tapered forwardly and is provided at the rear end with shoulders $3^a$, which fit against corresponding edges of the side plates. The blade 4 is provided with a lower enlarged portion, having a rearward extension 5, forming a tapering recess 6 in which fits a toe or extension 7 of the intermediate plate 2, whereby the blade is interlocked with the intermediate plate, as clearly illustrated in Fig. 2 of the drawings. The side and intermediate plates are secured together by rivets, or other suitable fastening devices, and the front edge of the intermediate plate is recessed or cut-away to receive the blade 4 and conformed to the configuration thereof and forms a seat for the same. The lower edges of the front portions of the intermediate and side plate and the lower edge of the plow points are arranged flush and form a straight horizontal bottom edge at the front of the plow in advance of the plowshares 8.

The plowshare is not claimed in the present application, as it forms the subject-matter of my co-pending application, No. 527,337, filed Nov. 10, 1909.

The plowshares 8, which are designed to be constructed of tool steel, or other suitable material are disposed horizontally and tapered forwardly, being of substantially triangular shape and having angularly disposed outer side edges, the outer edges converging forwardly, as clearly illustrated in Fig. 9 of the drawings. The inner edges are provided with vertical longitudinal flanges 9, arranged between the side plates, and secured to the same by transverse bolts 9ª, which plates are provided at the rear portions of their lower edges with outwardly extending horizontal flanges 10, tapered forwardly and having the plowshares secured to them by suitable fastening devices 11. The plowshares are fitted against the lower faces of the laterally projecting longitudinally disposed flanges 10, and in practice they will be removed therefrom for the purpose of sharpening their outer edges.

The outer edges of the plowshares are equipped with horizontally disposed forwardly projecting teeth 12, extending outward at an angle to the median line of the plow, and arranged at regular intervals, the teeth at one side of the plow being located directly opposite the teeth at the other side of the plow so that but two teeth at a time will enter the wood of the stump, thereby enabling the plow to be operated with comparatively little force. In practice the teeth may be arranged any distance apart and may be of any desired size and together with the upwardly extending cutting flanges 12ª will be varied to suit the character of the wood to be operated on.

The blades or flanges 12ª, which taper forwardly, are provided with upper cutting edges and are disposed in parallelism with each other and with the plane of the median line of the plow. The blades or flanges 12ª are located in rear of the front edges of the teeth at the outer sides of the latter. When the plow strikes a stump, the point will penetrate the same and the teeth of the plowshares will cut a horizontal kerf in the stump, while the upwardly extending blades, which operate longitudinally of the grain, sever and pull out the fibers of wood at the points cut by the teeth, and the stump is thereby torn up and pulled to pieces. The plow is designed to operate on stumps up to eight inches in diameter.

The lower edge 13 of the intermediate plate projects below the plowshares, as clearly illustrated in Figs. 3 and 4 of the drawings, and it is covered by a semi-tubular bottom strip 14, approximately U-shaped in cross section and incasing the projecting bottom edge of the intermediate plate. The strip or casing 14 is hinged at the front to the intermediate plate by a pivot 15ª, and it is adapted to be swung out of the way to facilitate the removal of the plowshares. The rear end of the strip or casing 14 is connected with an upwardly extending bar 15, located at the back of the plow and pivoted at its lower end to the casing 14 and secured at its upper end to an ear 16 of the intermediate plate, but it may be attached in any other desired manner.

The upper portions of the plates are secured between spaced longitudinal bars 17, which constitute the plow beam. The bars 17 are preferably in the form of channel iron bars to secure strength and lightness, but they may be of any other configuration and they are spaced apart by means of plates and by inclined braces 18, extending forwardly and upwardly from the plow at the upper end of the blade 4 to the front portion of the plow beam and secured at their front terminals between the same. The plow is also equipped with side braces 19, located at opposite sides of the plow beam and converging forwardly, the front ends of the braces being secured to opposite sides of the plow beam, and the rear end of the braces 19 being fastened to brackets 20. The brackets 20, which are constructed of suitable metal, consist of a horizontal portion 21, and inner and outer portions or flanges 22 and 23, the inner portion 22 extending downward from the horizontal portion and secured to the contiguous side plate, and the outer portion 23 being extended upward from the horizontal portion and having the rear end of the brace 19 secured to its inner face. By this construction the plow is thoroughly braced.

The side plate and the intermediate plate constitute a standard and extend above the upper end of the blade 4. The plow is equipped at the upper end of the blade with a movable cutter 24, coöperating with the upper portion of the blade and operating between or on side of the inclined braces or brace and adapted to sever the underbrush collecting in the throat of the plow at the crotch, formed by the inclined braces and the blade 4, whereby the plow is kept clear and is prevented from collecting underbrush and becoming clogged by the same. The knife 24, which is pivoted at its rear end to the plow by a suitable pivot 25, is connected by a pivot 26 to the lower end of the link or connecting bar 27, extending upwardly from the movable cutter or knife 24 through the space between the bars of the plow beam to the oscillatory lever 28. The operating lever 28 is fulcrumed at its rear end on the plow standard, the intermediate plate being provided with an upwardly projecting ear 29 through which the fulcrum pivot 30 passes. The front end of the lever 28 is connected by a link or pitman 31 with a crank element 32, mounted on a shaft 33. The shaft 33, which is journaled in suitable bearings of spaced supports 34 and 35, carries a sprocket wheel 36, located above the plow beam and adapted to receive a sprocket chain 37, as illustrated in dotted lines in Fig. 1 of the drawings. The supports 34 and 35 extend upwardly from the plow beam, the support 35 being interposed between the bars 17 and assisting in spacing the same. When the sprocket wheel is rotated motion is communicated through the crank connection to the lever 28, which oscillates the movable knife or cutter 24. Any brush or other accumulation collecting at the throat of the plow will be severed by the shearing action of the cutter 24.

The plow beam is equipped at its front with an adjustable clevis 38, and is adapted to run either deep or shallow, it being designed to operate from a depth of eight to twelve inches. The plows are designed to be operated in gangs of three or five or more, and are alternately arranged in rear of a traction engine 39, as illustrated in Fig. 5. They are connected with the traction engine by an attachment comprising a frame 40, mounted on an axle 41 and connected by links 42, or other suitable means to the traction engine. The axle 41, which is equipped with wheels 43, carries a sprocket wheel 44 for communicating motion to a counter shaft 45. The wheels 43 are arranged within the frame 40, and the sprocket wheel 44 receives a sprocket chain, which extends to a suitable sprocket wheel on the counter shaft, but any other form of gearing may be employed for imparting action from the axle to the counter shaft 45.

The attachment for connecting the plows with the traction engine is provided with an approximately U-shaped hitching frame 46, composed of two sides and a rear connecting portion with which the plow beams are connected. The front plows, which are preferably three in number, as shown, and the rear plows, which are two in number, have extended beams and are connected with the attaching frame 46 at the back thereof in the same transverse plane as the beams of the front plows. The attaching frame 46 is pivotally connected with the frame of the attachment by means of a transverse rod 47, and in practice, suitable means will be provided for raising and lowering the rear portion of the attaching frame. The attaching frame is designed to be raised to cause the plows to travel on their heels, when it is desired to transfer them from one point to another. The rear portions of the plows are connected by suitable links, and the links of the front plows extend beneath the beams of the rear plows.

Motion is communicated from the counter shaft 45 to the sprocket wheels of the several plows of the gang by means of sprocket chains 37 and sprocket wheels 48. Owing to the particular construction of plow it will travel in a straight line in rear of the traction engine and will not slide off laterally and pass around the stumps, but will effectively split the same. The stumps and brush are collected and are designed to be burned after the plow passes over the land. After the land has been operated on by the grubbing plow, it is ready for cultivation by a disk plow or an ordinary turning plow.

Having thus fully described my invention, what I claim as new and desire to secure by Letters Patent, is:

1. A plow of the class described including a thin point arranged to penetrate and split a stump, and laterally extending horizontally disposed plowshares located in rear of the said point and provided with teeth arranged to cut and tear up a stump.

2. A plow of the class described including a relatively thin vertically disposed forwardly tapered point arranged to pierce and penetrate a stump, and a horizontally disposed tapering plowshare located in rear of the plow point and provided with teeth arranged to cut and tear up the wood of the stump.

3. A plow of the class described including a vertically disposed forwardly tapered point, a vertical blade having an inclined cutting edge extending upwardly and rearwardly from the point, and a horizontal plowshare provided with teeth arranged to cut and tear up the wood of a stump.

4. A plow of the class described including a thin tapered point set in a vertical plane, and thin forwardly tapered plowshares arranged horizontally at opposite sides of the point.

5. A plow of the class described including a thin tapered point set in a vertical plane, and thin forwardly tapered plowshares arranged horizontally at opposite sides of the point, the side edges of the plowshares converging and provided with teeth.

6. A plow of the class described including opposite horizontally disposed plowshares having angularly related outer side edges, said side edges being provided at intervals with teeth, and the teeth at one plowshare being arranged opposite those of the other plowshare, and a relatively thin plow point extending in advance of the plowshares and arranged to split a stump.

7. A plow of the class described including a vertically disposed plow point, a vertically disposed blade having a cutting edge inclined upwardly from the plow point, and horizontally disposed forwardly tapered plowshares provided at intervals with approximately horizontal teeth and having upwardly extending tapered flanges located in rear of the front edges of the teeth.

8. A plow of the class described including spaced side plates, an intermediate plate secured between the side plates, a blade fitted between the side plates and interlocked with the intermediate plate and provided with a plow point.

9. A plow of the class described including side plates provided with laterally extending flanges, a plow point secured between the side plates, and plowshares secured to the flanges of the side plates.

10. A plow of the class described including side plates provided with laterally extending flanges, an intermediate plate, and plowshares secured to the laterally extending flanges of the side plates and provided with vertical flanges fitted between the side plates.

11. A plow of the class described including side plates having forwardly tapered portions, an intermediate plate also tapered and arranged between the side plates and terminating at the front end in a tapering toe, a blade secured between the side plates and provided with an enlargement having a recess receiving the said toe, said blade being also provided with a plow point fitted against the front ends of the side plates.

12. A plow of the class described including side plates provided with laterally projecting flanges, an intermediate plate arranged between the side plates and projecting below the flanges, plowshares secured to the said flanges, a strip incasing the projecting portion of the intermediate plate and hinged at one end, and means for securing the other end of the strip to the plow.

13. A plow of the class described including side plates provided with laterally projecting flanges, an intermediate plate arranged between the side plates and projecting below the flanges, plowshares secured to the said flanges, a strip incasing the projecting edge of the intermediate plate and hinged at its front end to the same, and an upwardly extending bar pivoted at its lower end to the strip and secured at its upper end to the plow.

14. A plow of the class described including a plow beam composed of spaced bars, plates arranged vertically and extending between the rear portions of the said bars, plowshares extending from the said plates and arranged for cutting stumps, inclined braces extending from the plates to the front portion of the beam, brackets secured to the plates and extending laterally therefrom to the rear portion of the beam, and angularly disposed braces secured to the brackets and extending to the front portion of the beam.

15. A plow of the class described including a plow beam composed of spaced bars, plates arranged vertically and extending between the rear portions of the said bars, plowshares extending from the said plates and arranged for cutting stumps, inclined braces extending from the plates to the front portion of the beam, brackets located at opposite sides of the plates and having depending inner attaching portions and outwardly extending upper flanges, the inner portions being secured to the said plates, and forwardly converging braces extending from the said flanges to the front portion of the beam.

16. A plow of the class described including a beam, a vertical standard connected at the top with the beam and having a front inclined edge, plowshares extending from opposite sides of the standard and arranged for cutting stumps, a movable blade arranged at the throat formed by the plow and the standard, and means for operating the movable blade for cutting underbrush and the like.

17. A plow of the class described including a beam, a vertical standard connected at the top with the beam and having a front inclined edge, plowshares extending from opposite sides of the standard and arranged for cutting stumps, a fixed inclined blade extending along the inclined edge of the standard, a movable blade arranged at the throat formed by the plow and the standard and coöperating with the fixed blade to cut underbrush and the like, and means for operating the movable blade.

18. A plow of the class described including a beam, a vertical standard connected at the top with the beam, plowshares extending from opposite sides of the standard and arranged for cutting stumps, a movable blade arranged at the throat formed by the plow and the standard, a lever connected with the movable blade, a crank element for operating the lever, and means for actuating the crank element.

19. A plow of the class described including a beam, a vertical standard connected at the top with the beam, plowshares extending from opposite sides of the standard and arranged for cutting stumps, a movable blade arranged at the throat formed by the plow and the standard, a lever located above the beam and fulcrumed at its rear end, a link connecting the lever with the movable blade, a crank element mounted on the beam at the front portion thereof and connected with the front end of the lever, and gearing for rotating the crank element.

20. A plow of the class described including a beam having spaced bars, a vertical standard secured between the spaced bars and having its front edge arranged at an angle to the beam for forming a throat, plowshares extending from opposite sides of the standard and arranged for cutting stumps, a lever extending longitudinally of the beam and fulcrumed at its rear end, a link extending through the space between the bars and connecting the cutter with the lever, spaced bearings carried by the front portion of the beam, a shaft journaled in the bearings, a sprocket wheel mounted on the shaft, and a crank element carried by the shaft and connected with the lever.

In testimony, that I claim the foregoing as my own, I have hereto affixed my signature in the presence of two witnesses.

CHRISTMAN D. JAUER.

Witnesses:
  C. L. BELL,
  D. O. KLINGEMANN.